United States Patent [19]

Asanuma et al.

[11] Patent Number: 5,952,426
[45] Date of Patent: Sep. 14, 1999

[54] METHOD FOR PREPARING MOLDED ARTICLES OF CROSS-LINKED POLYOLEFIN

[75] Inventors: Tadashi Asanuma; Kazuhiko Yamamoto; Kaoru Kawanishi, all of Takaishi, Japan

[73] Assignee: Mitsui Chemicals, Inc., Tokyo, Japan

[21] Appl. No.: 08/075,857

[22] Filed: Jun. 11, 1993

Related U.S. Application Data

[63] Continuation of application No. 07/804,726, Dec. 11, 1991, abandoned.

[51] Int. Cl.$^6$ .............................. C08L 23/12; C08L 43/04
[52] U.S. Cl. .............................. 525/209; 525/72; 525/195
[58] Field of Search .............................. 525/72, 209, 195, 525/240

[56] References Cited

U.S. PATENT DOCUMENTS

| | | | |
|---|---|---|---|
| 4,558,094 | 12/1985 | Deguchi | 525/72 |
| 4,602,094 | 7/1986 | Mitchell | 548/406 |
| 4,784,879 | 11/1988 | Lee et al. | 528/15 |
| 4,798,864 | 1/1989 | Topcik | 525/72 |
| 4,898,961 | 2/1990 | Baile | 556/479 |
| 4,925,671 | 5/1990 | Abber | 424/449 |
| 5,151,310 | 9/1992 | Yanagisawa | 428/65 |

FOREIGN PATENT DOCUMENTS

| | | |
|---|---|---|
| 310129 | 4/1989 | European Pat. Off. . |
| 365289 | 4/1990 | European Pat. Off. . |
| 2030899 | 11/1970 | France . |
| 1286460 | 8/1972 | United Kingdom . |
| 2066268 | 7/1981 | United Kingdom ................... 525/240 |

*Primary Examiner*—David Buttner
*Attorney, Agent, or Firm*—Burns, Doane, Swecker & Mathis, L.L.P.

[57] ABSTRACT

A method for preparing molded articles of a crosslinked polyolefin is here disclosed which comprises the steps of mixing polyolefin granules comprising polyolefin granules containing a hydrosilylation catalyst, polyolefin granules containing the copolymer of an alkenylsilane and an olefin, and if necessary, polyolefin granules containing neither the hydrosilylation catalyst nor the copolymer of the alkenylsilane and the olefin, and then heating, melting and molding the mixture in a molding machine.

According to the present invention, the molded articles of the crosslinked polyolefin containing no residual crosslinking agent and having improved heat resistance and mechanical strength can be obtained by the easy method which comprises mixing the above-mentioned respective granules, and then heating, melting and molding the mixture.

4 Claims, No Drawings

METHOD FOR PREPARING MOLDED ARTICLES OF CROSS-LINKED POLYOLEFIN

This application is a continuation of application Ser. No. 07/804,726, filed Dec. 11, 1991 now abandoned.

BACKGROUND OF THE INVENTION (i) Field of the Invention

The present invention relates to a method for preparing molded articles of a crosslinked polyolefin by allowing a crosslinking reaction to occur at the time of the molding of a polyolefin.

(ii) Description of the Prior Art The crosslinking of a polyolefin is utilized for various purposes such as for improving physical properties such as heat resistance and mechanical strength of the molded articles of the polyolefin and for improving the fluidity of the polyolefin at the time of foaming in the manufacturing process of molded articles of a foamed polyolefin. As a crosslinking process, there have been known a process in which a bifunctional monomer and a radical polymerization initiator are mixed with a polyolefin and the mixture is then heated, melted and molded to achieve the crosslinking, a process in which the molded polyolefin is irradiated with radiation to achieve the crosslinking, and a process in which a modified polyolefin having a hydrolyzable alkoxysilane group in its molecule is molded and then treated with boiling water to carry out hydrolysis, whereby an Si-O-Si bond is formed and thus the crosslinking is achieved (e.g., Japanese Patent Application Laid-open No. 58-117244).

Of these conventional techniques, the process using the bifunctional monomer has the problem that unreacted monomer tends to remain, and the process in which the crosslinking is achieved by the treatment after the molding is complex. Furthermore, the process in which the polyolefin is irradiated with radiation is scarcely applied to thick molded articles, and the process which comprises forming the Si-O-Si bond from the hydrolyzable alkoxysilane group by the hydrolysis reaction to achieve the crosslinking has the problem that the molded articles are poor in water resistance. Accordingly, it has been desired to develop an easy crosslinking process without the problem that unreacted monomer remains.

SUMMARY OF THE INVENTION

The present inventors have intensively conducted research on a method for easily preparing molded articles of a crosslinked polyolefin by which the above-mentioned problems can be solved, and the present invention has been completed.

That is, the present invention is directed to a method for preparing molded articles of a crosslinked polyolefin which comprises the steps of mixing two kinds of polyolefin granules comprising polyolefin granules containing a hydrosilylation catalyst and polyolefin granules containing a copolymer of an alkenylsilane and an olefin, or three kinds of polyolefin granules comprising the above-mentioned two kinds of polyolefin granules and polyolefin granules containing neither the hydrosilylation catalyst nor the copolymer of the alkenylsilane and the olefin, and then heating, melting and molding the mixture in a molding machine.

According to the method of the present invention, the crosslinking reaction of the polyolefin easily proceeds at the time of the molding, and molded articles of the crosslinked polyolefin having improved heat resistance and mechanical strength can be obtained. In addition, there is no problem that a crosslinking agent remains, and thus the present invention is industrially very valuable.

DETAILED DESCRIPTION OF THE INVENTION

A copolymer of an alkenylsilane and an olefin which can be used in the present invention can usually be obtained by polymerizing the olefin and the alkenylsilane by the use of the so-called Ziegler-Natta catalyst comprising a transition metal compound and an organo-metallic compound, and an example of this process is disclosed, for example, in U.S. Pat. No. 3,223,686. The above-mentioned copolymer may be a graft copolymer obtained by graft-polymerizing the alkenylsilane on a polyolefin in the presence of a radical polymerization initiator such as a peroxide by a heat treatment.

The alkenylsilane having at least one Si-H bond can be preferably used, and examples of the alkenylsilane include compounds represented by the formula $$H_2C=CH-(CH_2)_n-SiH_pR_{3-p} \quad (1)$$

(wherein n is an integer of from 0 to 12, p is an integer of from 1 to 3, and R is a hydrocarbon residue having 1 to 12 carbon atoms), and typical examples of the alkenylsilane include vinylsilane, allylsilane, butenylsilane, pentenylsilane and these compounds in which hydrogen atoms of 1 to 3 Si-H bonds of these monomers are substituted by chlorine atoms.

Furthermore, examples of the olefin include compounds represented by the formula $$H_2C=CH-R \quad (2)$$

(wherein R is hydrogen or a hydrocarbon residue having 1 to 12 carbon atoms), and typical examples of the olefin include α-olefins such as ethylene, propylene, butene-1, pentene-1, hexene-1, 2-methylpentene, heptene-1 and octene-1, styrene and derivatives thereof.

As the catalyst which can be used to obtain the copolymer of the olefin and the alkenylsilane in the present invention, there can be used a catalyst comprising $TiCl_3$ and triethylaluminum disclosed in the above-mentioned U.S. patent. However, more preferably, various highly active catalysts for providing polyolefins can be utilized which have been afterward developed. Therefore, the obtained copolymer may have any structure of isotactic, atactic and syndiotactic steric structures and mixtures thereof.

Usable examples of the polymerization method include a solvent method using an inert solvent, a mass polymerization method and a gaseous phase polymerization method.

In a preferred example of the catalyst comprising a transition metal compound and an organo-metallic compound, a titanium halide is used as the transition metal compound and an organoaluminum compound is used as the organometallic compound. Examples of such a catalyst include a catalyst comprising a product obtained by modifying titanium trichloride (which can be formed by reducing titanium tetrachloride with metallic aluminum, hydrogen or organoaluminum) with an electron-donating compound, an organoaluminum compound and, if necessary, an electron-donating compound such as an oxygen-containing organic compound; a catalyst comprising a transition metallic compound catalyst in which a titanium halide is carried on a carrier such as a magnesium halide or a carrier treated with an electron-donating compound, an organoaluminum compound and if necessary, an electron-donating compound such as an oxygen-containing organic compound; and a catalyst comprising a transition metallic compound catalyst (which can be obtained by dissolving the reaction product of magnesium chloride and an alcohol in a hydrocarbon solvent, treating the solution with a precipitant such as titanium tetrachloride to insolubilize the same in the hydrocarbon solvent, if necessary, treating it with an electron-donating compound such as an ester or an ether, and then treating it with titanium halide), an organo-aluminum compound and if necessary, an electron-donating compound such as an oxygen-containing organic compound [e.g., various examples of these catalysts are mentioned in Ziegler-Natta Catalysts and Polymerization by John Boor Jr (Academic Press), Journal of Macromolecular Science Reviews in Macromolecular Chemistry and Physics, C24 (3), p. 355–385 (1984), and the same C25 (1), p. 578–597 (1985)]. In addition, a catalyst comprising a transition metal catalyst which is soluble in a hydrocarbon solvent and an aluminoxane can also be used.

Here, preferable examples of the electron-donating compound usually include oxygen-containing compounds such as ethers, esters, orthoesters and alkoxysilicon compounds, and in addition, alcohols, aldehydes and water can also be used.

Usable examples of the organoaluminum compound include trialkylaluminums, dialkylaluminum halides, alkylaluminum sesquihalides and alkylaluminum dihalides, and examples of the alkyl groups thereof include a methyl group, ethyl group, propyl group, butyl group and hexyl group and examples of the halides thereof include chlorides, bromides and iodides.

Furthermore, the above-mentioned aluminoxane is an oligomer or a polymer which can be obtained by reacting the above-mentioned organoaluminum with water or crystal water.

No particular restriction is put on the polymerization ratio of the alkenylsilane in manufacturing the copolymer of the alkenylsilane and the olefin, but the amount of the alkenylsilane in molded articles of the final product should be in the desired range which will be referred to hereinafter. In the case of obtaining the polyolefin granules containing the copolymer from the copolymer singly, the alkenylsilane is used for the copolymerization so that the alkenylsilane unit may be usually present in an amount of 0.0001 to 10 mole %, preferably 0.001 to 1 mole % in the copolymer. On the other hand, in the case that the polyolefin granules containing the copolymer is prepared by mixing the copolymer and the polyolefin containing no alkenylsilane, the alkenylsilane is used for the copolymerization so that the alkenylsilane unit may be usually present in an amount of 0.001 to 30 mole %, preferably 0.1 to 10 mole % in the copolymer.

No particular restriction is put on the molecular weight of the copolymer, but in the case that it is intended to improve physical properties of the molded articles of the polyolefin by mixing the copolymer with the polyolefin to prepare the polyolefin granules, it is preferred that the molecular weight of the copolymer is equal to or lower than the molecular weight of the polyolefin. In a certain case, the copolymer of the present invention may be a copolymer obtained by carrying out the same polymerization (composition, molecular weight and the like) as in the preparation of the polyolefin except using the alkenylsilane, and for example, it may be a block copolymer obtained by copolymerizing the alkenylsilane only in the first half or in the latter half in performing a block copolymerization.

A graft copolymer obtained by graft-polymerizing the alkenylsilane on the polyolefin can also be used as the copolymer of the alkenylsilane and the olefin in the present invention. In this case, no particular restriction is put on the process of grafting the alkenylsilane on the polyolefin, and the process and conditions which can be used in the usual graft copolymerization can be utilized. Usually, the graft copolymerization can be easily carried out by heating the polyolefin and the alkenylsilane in the presence of a radical polymerization initiator up to a level higher than the decomposition temperature of the initiator. The preferred ratio of the alkenylsilane to be grafted is the same as in the case of the copolymerization of the alkenylsilane and the olefin.

If the thus obtained copolymer is in the state of particles, and if the size of these particles meets the undermentioned requirements, the copolymer can be directly used as a raw material for the subsequent molding step, but in general, the copolymer is granulated by means of an extruder or the like. At the time of the granulation, an additive such as an antioxidant may be added. Moreover, the granulation may be conducted after mixing the copolymer with a polyolefin containing no alkenylsilane. The thus obtained polyolefin granules containing the copolymer of the alkenylsilane and the olefin should have a diameter of 1 mm or more, the granules having a large bulk density and a good fluidity, for example, those in the form of pellets are preferable. That is, the copolymer should be in the state of the granules which can be easily fed to a molding machine as the raw material of the molding step. In this connection, it is important that the undermentioned hydrosilylation catalyst is not added at the time of the granulation.

As examples of the polyolefin containing no alkenylsilane which is used at the time of the granulation, the polyolefin which is the raw material for the preparation of the polyolefin granules containing the hydrosilylation catalyst, or the polyolefin which is the raw material for the preparation of the polyolefin granules containing neither the hydrosilylation catalyst nor the copolymer of the alkenylsilane and the olefin, there can be exemplified homopolymers of olefins represented by the formula (2), in the concrete, α-olefins such as ethylene, propylene, butene-1, pentene-1, hexene-1, 2-methylpentene, heptene-1 and octene-1, styrene and derivatives thereof, random copolymers of these olefins and the so-called block copolymers which can be formed by first homopolymerizing the olefin singly or copolymerizing the olefin and a small amount of another olefin, and then copolymerizing two or more kinds of olefins. In particular, it is effective and preferable that a poly-α-olefin such as a polypropylene which is difficult to crosslink singly or a copolymer of propylene and other olefin(s) is used as the above-mentioned polyolefin in the method of the present invention. The manufacturing methods of these polyolefins have already been known, and various products are commercially available on markets.

In addition, the polyolefin can be prepared by directly using the catalyst and the polymerization procedure which have been described in detail in the preceding paragraph regarding the preparation of the polymer of the olefin and the alkenylsilane. Therefore, the thus obtained polyolefin may have any structure of isotactic, atactic and syndiotactic steric structures, or a mixture thereof.

The thus obtained polyolefin can be directly used as the raw material for the subsequent molding step, if it is in the state of particles and meets the requirements concerning a particle diameter. However, the polyolefin is usually granulated, if necessary, together with an additive such as an antioxidant by the use of an extruder. The polyolefin granules containing neither the hydrosilylation catalyst nor the copolymer of the alkenylsilane and the olefin can be obtained in this way, but these granules should have a diameter of 1 mm or more. The granules having a large bulk density and a good fluidity, for example, those in the form of pellets are preferable.

In addition, the polyolefin granules containing the hydrosilylation catalyst can be obtained by mixing the undermentioned hydrosilylation catalyst at the time of the granulation.

In the present invention, no particular restriction is put on the hydrosilylation catalyst, and a known hydrosilylation catalyst can be utilized. Examples of the hydrosilylation catalyst include catalysts of metals in the group VIII of the periodic table such as tri-phenylphosphine complex of rhodium, chloroplatinic acid and salts thereof (Chemistry of Organic Silicon Compounds, Makoto Kumada et al., published by Kagaku Dojin, p. 165), radical initiators such as azo compounds, amines such as triethylamine, and alkoxy compounds of metals in the group IVb of the periodic table. In particular, the transition metal catalysts are effective in small amounts.

In the present invention, the polyolefin granules containing the hydrosilylation catalyst can be obtained by mixing the hydrosilylation catalyst in granulating the polyolefin containing no alkenylsilane copolymer as described above, and when the hydrosilylation catalyst is mixed so that the amount of the hydrosilylation catalyst may be from 0.001 to 1% by weight based on the polyolefin and the polyolefin is then heated, melted and granulated, if necessary, together with an additive such as an antioxidant by the use of an extruder or the like, the polyolefin granules in which the hydrosilylation catalyst is uniformly dispersed can be obtained. Additionally, in certain cases, the polyolefin granules containing the hydrosilylation catalyst can be prepared by bringing a solution containing the dissolved hydrosilylation catalyst into contact with the polyolefin granules containing no alkenylsilane copolymer to impregnate the polyolefin granules with the hydrosilylation catalyst.

The thus obtained two kinds of polyolefin granules, i.e., the polyolefin granules containing the hydrosilylation catalyst and the polyolefin granules containing the copolymer of the alkenylsilane and the olefin, or the three kinds of polyolefin granules, i.e., the above-mentioned two kinds of polyolefin granules and the polyolefin granules containing neither the hydrosilylation catalyst nor the copolymer of the alkenylsilane and the olefin are mixed, and then heated, melted and molded by a molding machine, so that a crosslinking reaction proceeds due to the formation of a Si-C bond simultaneously with the molding, whereby molded articles of the crosslinked polyolefin are obtained.

In the case that the three kinds of polyolefin granules are used, no particular restriction is put on the ratio of the three kinds of granules. However, if the polyolefin granules containing the hydrosilylation catalyst and the polyolefin granules containing the copolymer of the alkenylsilane and the olefin are extremely localized in the mixture, the progress of the crosslinking reaction at the time of the molding is not sufficient sometimes. Therefore, it is preferable to regulate the contents of the hydrosilylation catalyst and the alkenylsilane in the granules so that each of the polyolefin granules containing the hydrosilylation catalyst and the polyolefin granules containing the copolymer of the alkenylsilane and the olefin may be present in a ratio of 1 or more to 100 of the total of the obtained molded articles.

The ratio of the copolymer of the alkenylsilane and the olefin in the molded articles is preferably regulated so that the content of the alkenylsilane unit in the molded articles may be present in an amount of 0.0001 mole % or more, depending upon the content of the alkenylsilane in the copolymer. Furthermore, this content should be 1.0 mole or less from the viewpoint of moldability and so as to decrease the amount of the expensive alkenylsilane. In consequence, the content of the alkenylsilane unit in the molded articles is preferably from about 0.0001 to about 1.0 mole %.

No particular restriction is put on the amount of the hydrosilylation catalyst to be used, as long as this amount is such that the reaction adequately proceeds. If enough dispersion is obtained, the reaction sufficiently proceeds even when the amount of the hydrosilylation catalyst is about 0.00001% by weight with respect to the total of the molded articles, and hence the preferable amount of the hydrosilylation catalyst is from about 0.00001 to about 0.1% by weight.

At the time of the mixing, the polyolefin granules containing various known additives can be used without particular restriction. The mixing of the granules is relatively easy, and so a usual mixing manner is acceptable.

In the present invention, the mixture of the thus obtained granules is introduced into a molding machine and then molded thereby. In this case, there is preferably used the molding machine which can be utilized in using usual master pellets and which is constituted so as to achieve the enough mixing at the time of the heating and melting. A heating temperature is a usual molding temperature, and it is 50° C. or more, preferably 80° C. or more.

In the present invention, the crosslinking reaction proceeds simultaneously with the molding, and therefore, examples of the molding technique include injection molding and extruding molding, by which the crosslinking can easily be achieved to obtain the molded articles.

Now, the present invention will be described in detail in reference to examples.

EXAMPLE 1

A vibration mill equipped with four 4-liter grinding pots containing 9 kg of steel balls of 12 mm in diameter was used. In each of these pots were placed under a nitrogen atmosphere 300 g of magnesium chloride, 60 ml of tetraethoxysilane and 45 ml of $\alpha,\alpha,\alpha$-trichlorotoluene, and they were then ground for 40 hours. 300 g of the thus ground material were placed in a 5-liter flask, and 1.5 liters of titanium tetrachloride and 1.5 liters of toluene were added thereto. The solution was then stirred at 100° C. for 30 minutes, and a supernatant liquid was removed therefrom. 1.5 liters of titanium tetrachloride and 1.5 liters of toluene were added thereto again, and the solution was then stirred at 100° C. for 30 minutes and a supernatant liquid was removed therefrom. Afterward, the solid was washed with n-hexane repeatedly to obtain a transition metal catalyst slurry. A part of the slurry was sampled and then analyzed, and as a result, the content of titanium was 1.9% by weight.

Under a nitrogen atmosphere, in a 5-liter autoclave were placed 40 ml of toluene, 100 mg of the above-mentioned transition metal catalyst, 0.128 ml of diethylaluminum chloride, 0.06 ml of p-methyl toluate and 0.20 ml of triethylaluminum. Furthermore, 1.5 kg of propylene and 40 g of vinylsilane were added thereto and 1N liter of hydrogen was introduced thereinto under pressure, and polymerization was then carried out at 75° C. for 2 hours. After the polymerization, unreacted propylene was purged, and the resultant powder was taken out, filtered and then dried to obtain 180 g of the powder.

The intrinsic viscosity (hereinafter abbreviated to "$\eta$") of the obtained powder was measured in a tetralin solution at 135° C. and the melting point and the crystallization temperature of the powder were also measured performing temperature rise and temperature drop at 10° C./minute by the use of a differential thermal analysis device. As a result, the powder was a crystalline propylene copolymer in which η was 1.72, the melting point was 153° C. and the crystallization temperature was 118° C. Furthermore, according to an elemental analysis, the content of vinylsilane unit was 1.2% by weight.

To 50 g of the thus obtained copolymer were added 850 g of a homopolymer of propylene (which was prepared by polymerization without adding vinylsilane in accordance with the above-mentioned procedure and in which η was 2.25 and when extraction was carried out with n-hexane for 6 hours, the ratio of a residue was 97.3%) and 1.0 g of a phenolic antioxidant, and they were sufficiently mixed and then granulated at 250° C. by the use of an extruder having a diameter of 20 mm, thereby obtaining pellets of a polypropylene containing a copolymer of vinylsilane and propylene.

On the other hand, 1000 g of the above-mentioned propylene homopolymer were mixed with 1.0 g of triphenylphosphine complex of rhodium chloride and 1 g of a phenolic antioxidant, and the mixture was then similarly granulated, thereby obtaining pellets of a polypropylene containing a triphenylphosphine complex catalyst of rhodium. 90 parts of the pellets containing the copolymer were mixed with 10 parts of the pellets containing the catalyst, and the mixture was then molded by the use of an injection molding machine, FKS 55-1 made by Komatsu Ltd. to obtain molded articles for physical properties measurement having a thickness of 2 mm and a thickness of 1 mm. In this case, moldability was good, and when the molded articles were extracted with boiling xylene for 12 hours, the content of insolubles was 45% by weight. In addition, when the mixture before the molding was directly extracted with boiling xylene for 12 hours, the content of insolubles was 0.6% by weight. When these molded articles were further subjected to a heat treatment at 140° C. for 30 minutes, the content of insolubles in xylene was 92% by weight. Moreover, the molded articles before and after the heat treatment were not deformed even at 180° C.

COMPARATIVE EXAMPLE 1

The same procedure as in Example 1 was effected except that a copolymer of vinylsilane was not used. That is, 10 parts of pellets containing a hydrosilylation catalyst were mixed with 90 parts of pellets prepared by using 850 g of a propylene homopolymer and 1 g of a phenolic antioxidant, and the mixture was then injection-molded to obtain molded articles. The thus obtained molded articles were extracted with boiling xylene for 12 hours, and as a result, the content of insolubles was 0.3% by weight.

When heated at 180° C., these molded articles were deformed.

COMPARATIVE EXAMPLE 2

Pellets of a polypropylene containing a triphenylphosphine complex of rhodium chloride were not used, and pellets of a polypropylene containing a copolymer of vinylsilane and propylene were only molded by the same procedure as in Example 1, and evaluation was then made in the same manner as in Example 1. When molded articles were extracted with boiling xylene for 12 hours, the content of insolubles was 0.8% by weight.

EXAMPLE 2

The same procedure as in Example 1 was effected except that 1.0 g of a triphenylphosphine complex of rhodium chloride was replaced with 1.0 g of chloroplatinic acid (tetravalent), thereby obtaining pellets of a polypropylene containing a hydrosilylation catalyst. These pellets were then molded in the same manner as in Example 1 to prepare molded articles. When the molded articles were extracted with boiling xylene for 12 hours, the content of insolubles was 53% by weight.

EXAMPLE 3

Polymerization was made by the same procedure as in Example 1 except that 40 g of vinylsilane were replaced with 1 g of allylsilane, thereby obtaining a copolymer of allylsilane and propylene in which the content of allylsilane unit was 0.04% by weight. In this case, η, the melting point and the crystallization temperature of the copolymer were 2.10, 158° C. and 114° C., respectively. When extraction was carried out with boiling n-heptane for 6 hours, the ratio of a residue was 96.2%. 1000 g of this powder were mixed with 1.0 g of a phenolic antioxidant, and the mixture was then granulated at 250° C. by the use of an extruder to obtain pellets of a copolymer of allylsilane and propylene. 90 parts by weight of these pellets and 10 parts by weight of pellets of a triphenylphosphine complex of rhodium chloride obtained in Example 1 were mixed and then molded in the same manner as in Example 1. The molded articles were extracted with boiling xylene for 12 hours, and in this case, the content of insolubles was 40% by weight.

What is claimed is:

1. A method for preparing molded articles of a crosslinked polyolefin which comprises the steps of mixing two kinds of polyolefin granules comprising polyolefin granules containing a hydrosilylation catalyst and polyolefin granules containing a copolymer of an alkenylsilane and an olefin, or three kinds of polyolefin granules comprising said two kinds of polyolefin granules and polyolefin granules containing neither the hydrosilylation catalyst nor the copolymer of the alkenylsilane and the olefin, and then heating, melting and molding the mixture in a molding machine whereby a crosslinking reaction occurs in the molding machine so as to obtain a crosslinked article in the absence of contact with water, said alkenylsilane having the formula:

$$H_2C=CH-(CH_2)_n-SiH_pR_{3-p} \qquad (1)$$

wherein n is an integer of from 0 to 12, p is an integer of from 1 to 3, and R is a hydrocarbon residue having 1 to 12 carbon atoms.

2. The method for preparing molded articles of a crosslinked polyolefin according to claim 1 wherein all of said two or three kinds of polyolefin granules to be mixed are pellets having a diameter of 1 mm or more.

3. A method for preparing molded articles of a crosslinked polypropylene which comprises the steps of mixing two kinds of polypropylene granules comprising polypropylene granules containing a hydrosilylation catalyst and polypropylene granules containing a copolymer of an alkenylsilane and propylene, or three kinds of polypropylene granules comprising said two kinds of polypropylene granules and polypropylene granules containing neither the hydrosilylation catalyst or the copolymer of the alkenylsilane and propylene, and then heating, melting and molding the mixture in a molding machine whereby a crosslinking reaction occurs in the molding machine so as to obtain a crosslinked article in the absence of contact with water, said alkenylsilane having the formula:

$$H_2C=CH-(CH_2)_n-SiH_pR_{3-p} \qquad (1)$$

wherein n is an integer of from 0 to 12, p is an integer of from 1 to 3, and R is a hydrocarbon residue having 1 to 12 carbon atoms.

4. (Twice Amended) A method for preparing molded articles of a crosslinked polyolefin which comprises the steps of mixing two kinds of polyolefin granules comprising polyolefin granules containing a hydrosilylation catalyst and polyolefin granules of a copolymer of an alkenylsilane and an olefin, or three kinds of polyolefin granules comprising said two kinds of polyolefin granules and polyolefin granules containing neither the hydrosilylation catalyst nor the copolymer of the alkenylsilane and the olefin, and then heating, melting and molding the mixture in a molding machine whereby a crosslinking reaction occurs in the molding machine so as to obtain a crosslinked article in the absence of contact with water, said alkenylsilane having the formula:

$$H_2C=CH-(CH_2)_n-SiH_pR_{3-p} \qquad (1)$$

wherein n is an integer of from 0 to 12, p is an integer of from 1 to 3, and R is a hydrocarbon residue having 1 to 12 carbon atoms.

* * * * *

UNITED STATES PATENT AND TRADEMARK OFFICE
CERTIFICATE OF CORRECTION

PATENT NO. : 5,952,426
DATED : September 14, 1999
INVENTOR(S) : Asanuma, et al

It is certified that error appears in the above-identified patent and that said Letters Patent is hereby corrected as shown below:

On the title page, insert the following:
-- [30] Foreign Application Priority Data
   Dec. 19, 1990  [JP]  Japan ......................2-403710 --

In Column 9, Claim 4, please delete "(Twice Amended)".

Signed and Sealed this

Twenty-fifth Day of April, 2000

Attest:

Q. TODD DICKINSON

*Attesting Officer*   *Director of Patents and Trademarks*